United States Patent [19]
Knapp

[11] Patent Number: 5,270,711
[45] Date of Patent: Dec. 14, 1993

[54] TOUCH SENSOR ARRAY SYSTEMS AND DISPLAY SYSTEMS INCORPORATING SUCH

[75] Inventor: Alan G. Knapp, Crawley, England

[73] Assignee: U.S. Philips Corporation, New York, N.Y.

[21] Appl. No.: 516,619

[22] Filed: Apr. 30, 1990

[30] Foreign Application Priority Data

May 8, 1989 [GB] United Kingdom ............... 8910522

[51] Int. Cl.$^5$ ................................ H03K 17/94
[52] U.S. Cl. ........................ 341/34; 178/18; 345/174; 345/104
[58] Field of Search .......... 178/18; 340/711, 712, 340/706; 84/DIG. 7, DIG. 8, DIG. 20; 341/33, 34

[56] References Cited

U.S. PATENT DOCUMENTS

| | | | |
|---|---|---|---|
| 2,873,637 | 2/1959 | Herold | 341/33 X |
| 3,740,744 | 6/1973 | Nakada et al. | 341/33 |
| 3,877,029 | 4/1975 | Larson et al. | 341/33 X |
| 4,145,748 | 3/1974 | Eichelberger et al. | 341/33 |
| 4,290,061 | 9/1981 | Serrano | 340/712 |
| 4,827,085 | 5/1989 | Yaniv et al. | 178/18 |
| 4,839,634 | 6/1989 | More et al. | 341/33 X |

Primary Examiner—Ulysses Weldon
Attorney, Agent, or Firm—Jack D. Slobod

[57] ABSTRACT

A touch sensor array system comprises an array of sensor elements (12) each actively addressable by means of a switch device (16), for example two terminal devices such as diodes or MIMs, or TFTs, controlled by a driver circuit (22) to load a predetermined charge into a capacitor (14) of the element. Touching a sensor element dissipates this charge which is detected during a subsequent addressing stage by sensing particular charging characteristics with a monitoring circuit (24). With a row and column array, the elements (12) are addressed one row at a time at regular intervals using a row conductor (18) common to a row of elements. Each column of elements shares a column conductor (20) connected to the monitoring circuit. Various schemes are described enabling wired or isolated styli or a finger to be used as position designating means. The array is fabricated using thin film deposition techniques and high resolution arrays are easily achieved. The system can be used as a display overlay.

1 Claim, 5 Drawing Sheets

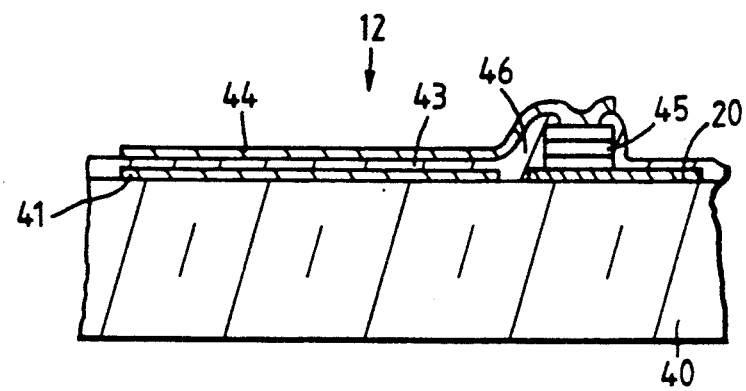
Fig.3.
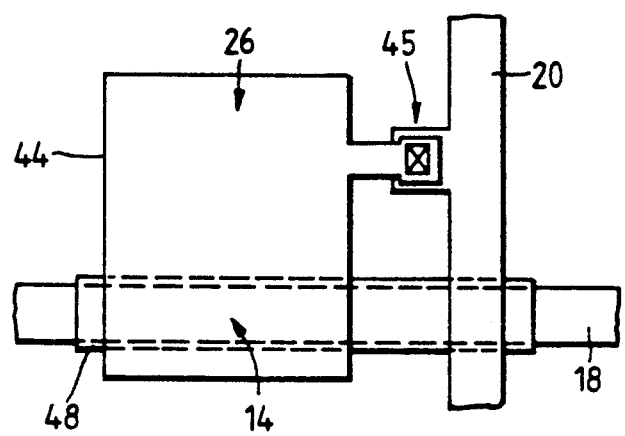
Fig.4.
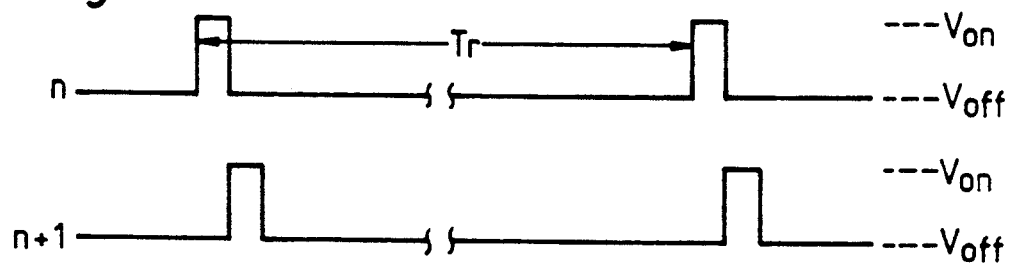
Fig.5a
Fig.5b
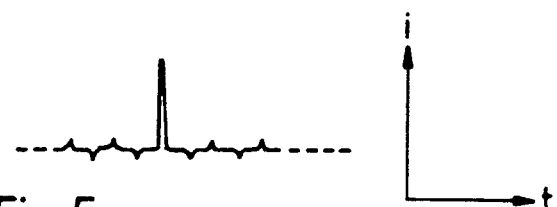
Fig.5c

TOUCH SENSOR ARRAY SYSTEMS AND DISPLAY SYSTEMS INCORPORATING SUCH

BACKGROUND OF THE INVENTION

1. Field of the Invention

This invention relates to touch sensor array systems for deriving signals which represent any position selected by touch, for example through finger contact or by a stylus, in a given two dimensional area.

Such a system may be used as an overlay for the display screen of an LC or other display device to provide for example selected inputs to a display or other system in accordance with touched positions in the sensor array. In another example, the system may be used as a stand-alone graphics tablet connected to a computer system for enabling a user to enter information based on graphical representations drawn on the sensor array.

2. Description of the Related Art

Various kinds of touch sensor array systems are known. In one known arrangement, the system uses light emitters and light sensors positioned around the periphery of a sensing area. The emitters produced an X-Y grid of light beams directed onto the light sensors. When these beams are interrupted, for example by a person's finger, the position of the interruption is determined by sensing a change in the outputs of the light sensors affected.

In another known arrangement, sets of conductive strips extend at right angles to each other over a sensing area. The strips of the two sets are normally spaced but pressure at any point by a person's finger causes a conductor of one set to contact a conductor of the other set, the two conductors thus contacting being indicative of the location of that point.

In another kind of touch sensor array system, capacitive effects are utilised. In an example, pairs of spaced conductive strips or pads are provided which can either be physically displaced with respect to one another in response to finger pressure so as to alter the capacitance therebetween or capacitively coupled together in response to proximity of a user's finger.

The above known kinds of systems typically have only limited resolution capabilities. Moreover, these known arrangements rely in operation on a simple scanning drive scheme which means that for a touched position to be sensed, the actual touching must coincide with the scanning of the sensor element concerned.

It is an object of the present invention to provide a touch sensor array system which is capable of high resolution.

SUMMARY OF THE INVENTION

It is another object of the present invention to provide a touch sensor array system in which sensing of a touch can be carried out after the event.

According to one aspect of the present invention, a touch sensor array system comprising an array of sensing elements is characterised in that each sensing element includes a switch device and is actively addressable by means of a drive circuit controlling operation of the switch device to load a storage device thereof with an electrical characteristic, the sensing element being such that the electrical characteristic is changed in response to touching thereof with position designating means, the system further including means for monitoring said electrical characteristics of the sensor elements.

Being actively addressed, each sensor element can be loaded with the electrical characteristic during a loading period, when the element is addressed so as to turn 'on' the switch device, with that characteristic thereafter being retained, when the switch device is turned 'off' to isolate the sensor element following addressing, until, and if, touching by an object, for example a user's finger, occurs at which time the characteristic is altered. At some later point in time, the state of the sensor device can be checked to determine if the electrical characteristic has altered, thus indicating whether or not the sensor element has been touched, and an output provided accordingly. In effect therefore the device acts as an array of memory elements whose individual states are altered by touch. Upon reading the array of memory elements those whose states are indicative of having been touched and their location are ascertained.

Active addressing of the sensor elements enables large numbers of sensor elements to be used giving a high element density or high resolution and without the kind of problems which could be expected with simple multiplexing techniques.

Preferably, each sensor element is arranged to be actively addressed and monitored periodically, and more especially at regular intervals, so as to enable a series of successive touches to be sensed rather than simply one time events. The monitoring means responds to a change in the electrical characteristic of an element following addressing thereof. For convenience, the monitoring of the electrical characteristic of the sensor elements is accomplished concurrently with addressing, for example by sensing a predetermined behaviour of electrical signals supplied to the sensor element during loading, to provide a signal output in accordance therewith, so that touching of a sensor element at any time throughout the periods between loading can be determined. However, the monitoring of the sensor elements could be carried out at some other stage, although preferably at regular intervals related to addressing, for example at a repetition rate equivalent to, or a multiple of, the addressing repetition rate.

The electrical characteristic could be a voltage or a capacitance for example.

In a preferred embodiment, the sensor elements each include an electrical charge storage device, for example in the form of a capacitor, with the electrical characteristic comprising a defined level of charge stored in the device, this charge being dissipated, either partly or completely, upon touching of the sensor element with position designating means, for example a user's finger or a stylus. In use, therefore, a given electrical charge is loaded into the storage device and retained by virtue of the active addressing circuit, assuming the sensor element is not touched. If and when it is touched, this charge is dissipated so that by monitoring the charge on the storage device it can be established whether or not touching has taken place.

The charge on the storage device can be refreshed, if dissipated, by addressing the sensor elements in a recurrent cycle. Changes in the stored charge can then be readily determined by monitoring the charging characteristics of the storage devices during addressing.

The switch device provided for each sensor element by which active addressing of the sensor elements is accomplished may be a three terminal switching device such as a transistor, for example a TFT, or a two terminal non-linear device which, in operation, exhibits a threshold characteristic, for example one or more diode elements or one, or more, MIM (Metal-Insulator Metal) devices. Series diodes, diode rings or parallel MIMs for example can be used. In these respects, the sensor array may be fabricated using matrix switching technology generally similar to that developed for active matrix addressed display devices, with the switching devices and the storage devices being fabricated on a substrate using thin film deposition techniques. Operation in active addressing of the sensor elements also is accomplished in similar manner to these display devices. In active matrix display devices each picture element consists of a display element having a first electrode carried on one substrate, together with an associated switching device, and a second electrode carried on a further, spaced, substrate with electro-optical material, for example liquid crystal, therebetween. For the sensor array the storage devices of the sensor elements can be considered as generally analogous to either the display elements or storage capacitors sometimes provided in association with the display elements.

For simplicity the storage elements may each comprise a pair of electrodes separated by dielectric carried on a common substrate, the electrodes being formed by superimposed conductive layers deposited on the substrate.

In an embodiment each sensor element has a conductive layer in the form of a contact pad which is exposed so as to be touchable by a finger or a conductive stylus. This pad may either be connected to one side of a capacitor constituting the storage device or alternatively may comprise a part or all of the conductive layer constituting one side of the capacitor. In another arrangement the pad electrode may be divided with one part being connected to, or comprising part of the storage device and the other part being at a predetermined potential, the two parts being adapted to be bridged by the user's finger, or a stylus. The two parts are preferably interdigitated.

In an alternative arrangement, a flexible conductive means, for example a film, connected to a predetermined potential may be disposed over one of the electrodes of the charge storage device and deformed by a user's finger or a stylus so as to contact that electrode.

The sensor elements of the array may be addressed by two sets of address and sense conductors. In an X-Y array of sensor elements therefore, the address and sense conductors may comprise row and column conductors respectively with each sensor element, comprising the storage device and the switching device in series, being connected between a respective pair of row and column conductors, in the same manner as used for active matrix display devices.

Also as in active matrix display devices, the sensor elements in each row and in each column share respectively the same row and column address conductors, addressing of the sensor elements being accomplished by providing each successive row conductor in turn with a select signal to turn on the switch devices of the sensor elements in the row and load their charge storage devices.

According to another aspect of the present invention, there is provided a display system comprising a display device and a touch sensor array system according to the one aspect of the invention in which the sensor elements of the array are positioned over the display output of the display device.

BRIEF DESCRIPTION OF THE DRAWING

Various embodiments of touch sensor array systems in accordance with the invention will now be described, by way of example, with reference to the accompanying drawings, in which:

FIG. 3 is a schematic cross-section through a part of the system of FIGS. 1 and 2, not to scale;

FIG. 4 is a schematic plan view of a typical sensor element illustrating a modified form of construction, FIGS. 5a and 5b, illustrate exemplary drive waveforms used for consecutive row conductors in the system of FIG. 1;

FIG. 5c illustrates a sense waveformat a column conductor in the system of FIG. 1;

DESCRIPTION OF THE PREFERRED EMBODIMENTS

Figure 1:
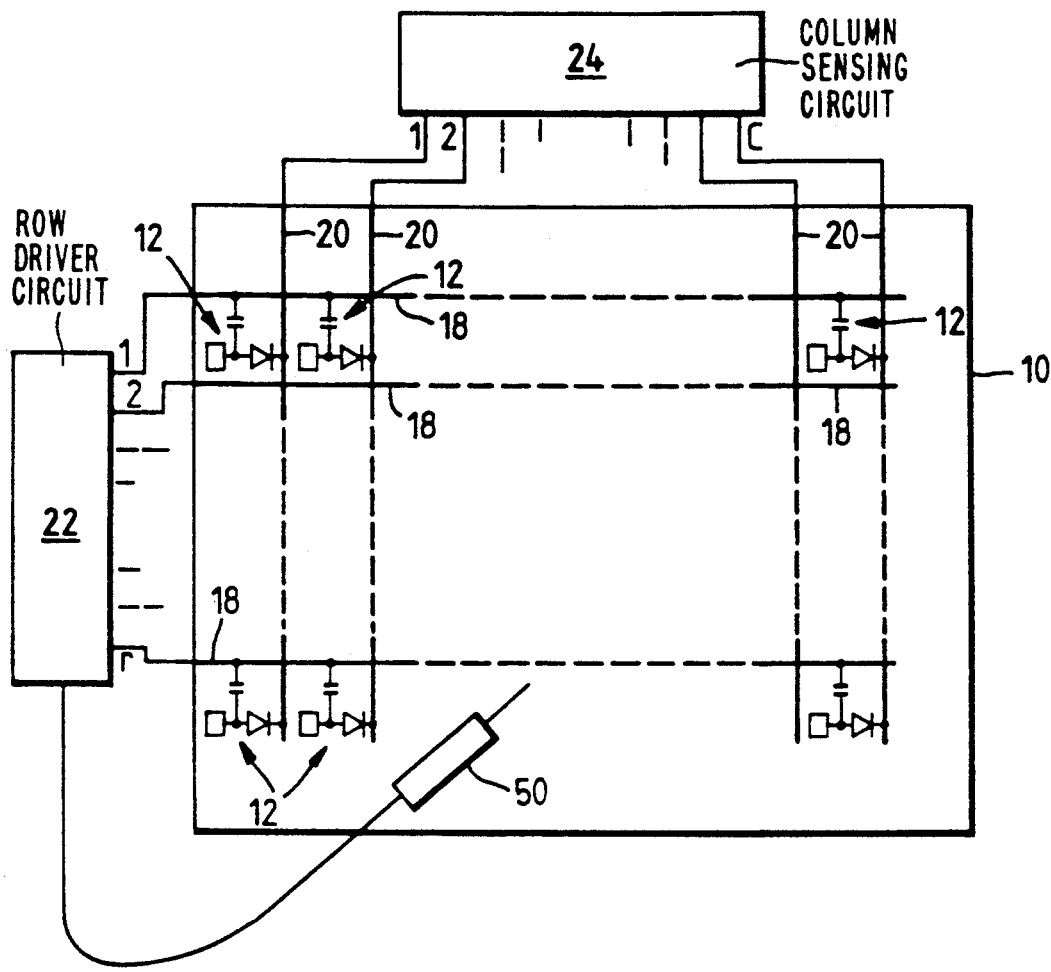
FIG. 1 is a simplified schematic block diagram of one embodiment of touch sensor array system in accordance with the invention showing an array of individual sensor elements and associated drive and sensing circuits for row and column conductors of the array.

Referring to FIG. 1 the touch sensor array system comprises an active matrix addressed sensor panel 10 with an X-Y array of sensor elements consisting of r rows (1 to r) with c columns, there being c horizontal sensor elements 12 (1 to c) in each row. A panel having only the few rows and columns of sensor elements is shown in FIG. 1 for simplicity. In practice there may be several hundred rows and several hundred columns, the numbers chosen depending on the intended use of the sensor array system. If used, for example, as a user interface for a computer graphics system, the number of sensor elements and the ratio of rows to columns would normally depend on the pixel count and aspect ratio of the display of the system. The number of pixels could be 100,000 or more. If used as a display overlay a 1:1 correspondence between pixels and sensor elements could be provided.

Figure 2:
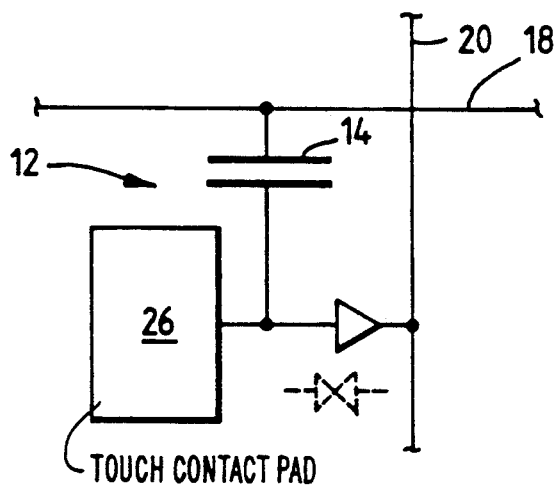
FIG. 2 shows schematically the equivalent circuit of a typical sensor element of the system of FIG. 1 comprising a two terminal non-linear switching device.

Referring also to FIG. 2, each sensor element 12 comprises a charge storage device in the form of a capacitor 14 connected with an active device, which in this embodiment comprise a two terminal non-linear resistance device 16, in the form for example of one (as shown) or more, diode elements or MIMs, that exhibit a threshold characteristic in operation and act as a switch.

The X-Y array is addressed via sets of row and column address conductors 18 and 20. The sets of address conductors extend at right angles to one another with an individual sensor element located at each respective intersection of the conductors. All sensor elements in the same row are connected to a respective common row conductor and all sensor elements in the same column are connected to a respective common column conductor. The row conductors 18 are connected at their ends to a row driver circuit, generally referenced at 22, and the column conductors 20 are connected at their ends to a sensing circuit, generally referenced at 24.

Referring to the circuit configuration of a typical sensor element 12 shown in FIG. 2, the capacitor 14 is connected in series with the active device 16, here shown as a unidirectional diode element, between respective column and row conductors 20 and 18. The device 16 in this embodiment comprises a pin diode element but other forms of two terminal non-linear devices, both unidirectional and bidirectional, may be used, for example nin diodes, MIMs, back to back diodes, diode rings, and the like. An alternative bidirectional device, for example a MIM, is illustrated in dotted outline.

At the junction between the capacitor 14 and switch device 16 there is connected a touch electrode pad 26. In practice, this pad 26 may comprise an electrode formed separately to, but interconnected with, the components 14 and 16 or alternatively may be constituted by part or all of the electrode of the capacitor 14 connected to the active device 16. The latter arrangement is preferred as the numbers of component parts then necessary is minimised.

Fabrication of the array of sensor elements and address conductors is based on technology used in active matrix addressed display devices, such as liquid crystal display devices. This technology is now well established as a means for producing large area active matrix arrays and, as such, it is considered unnecessary to describe here in detail methods by which the panel of the sensor array device of the invention can be fabricated. Typically, this involves deposition and defining a number of superimposed layers on a substrate. Further details of fabricating arrays of diode and MIM elements, address conductors and electrodes on a substrate, as used in LC display devices, may be obtained for example from GB-A-2144266, EP-A-150798, GB-A-2129183, and U.S. Pat. No. 4,413,883 to which reference is invited.

The sensor array is constructed in similar manner although with certain modifications because it is necessary to incorporate two sets of address conductors and capacitive components on the substrate.

An example of one form of construction is illustrated in FIG. 3 which is a cross-section through a representative part of the panel comprising one complete sensor element 12, although it will, of course, be appreciated that other forms of construction could easily be employed. The element 12 is fabricated by depositing a conductive layer on an insulative substrate 40, for example of glass, and defining this layer to form the set of column conductors 20 and the first electrodes, 41, of the capacitors 14. Amorphous silicon pin diodes 45 are then formed on lateral extensions of the column conductors 20 in known manner, for example as described in the aforementioned specifications. A layer 46 of insulative material, such as silicon nitride, is then deposited over the structure and windows defined in this layer over the diode elements and over a portion of the electrodes 41. A further conductive layer is then deposited and defined photolithographically to form, firstly, the set of row conductors 18 (not visible in FIG. 3) crossing over the column conductors and separated therefrom by the insulative layer 46 which contact the electrodes 41 through respective windows in the layer 46 and, secondly, discrete conductive regions 44 constituting the contact pads 26 and the second electrodes of the capacitors 14 which have extensions that contact their associated diode element 45 through windows in the layer 46.

Thus an array of sensor elements is provided on a substrate in each of which the capacitor 14, constituted by the electrodes 41 and 44 and the intervening insulative material 43 acting as dielectric, is connected in series with a diode element 45 between a row and column conductor.

A protective insulative layer may be deposited over the structure and windows provided in this layer corresponding to the positions of the contact pads 44 of the capacitors to permit contact with these pads.

The electrodes 41 and 44 may be substantially co-terminous.

In an alternative form of construction, illustrated by the plan view of a typical sensor element in FIG. 4, overlap between part of the contact pad 26 and the row conductor is used to provide the capacitor 14. A layer of insulative material 48 is defined over the row conductor 18 and the subsequently deposited electrode 44, forming the contact pad 26, arranged to extend over the row conductor so that the region of overlap constitutes the capacitor 14. As before, for each sensor element the capacitor 14 is connected in series with the pin diode element 45 between the row and column conductors 18 and 20.

The physical dimensions of the capacitors 14 and the materials used to form the capacitors 14 may be varied to suit the particular requirements of the sensor array in use. For example the dimensions of the capacitor would be chosen in accordance with the desired resolution characteristics. These may be of the same order as used for pixel elements in an active matrix display device, say around 100 micrometers square, or larger. The conductive layers may be of metal. For a transparent sensor array panel, suitable for use as a display overlay, appropriate transparent conductive materials such as ITO may be employed instead.

In operation of this touch sensor array system, the exposed electrodes 44 of the sensor elements are contactable by a user-manipulated conducting stylus, referenced at 50 in FIG. 1. The capacitors 14 of the sensor elements are charged to potential of a few volts during a charging period, which is regularly repeated, following which they are left electrically isolated by virtue of the active elements 16 until interrogated some time later during a sensing period. If during the period between charging and sensing the capacitor electrode 44 of a sensor element has been touched with the stylus some of its charge will have been removed. This change is detected during the sensing period and further circuitry allows the sensor elements which have been touched to be identified.

The current-voltage characteristic of the diode elements has a high current ("on") region and a low current ("off") region. Examples of the drive and sense wave forms are shown in FIG. 5, in which FIGS. 5a and 5b illustrate select voltage waveforms applied to the nth and (n+1)th row conductors 18 respectively and FIG. 5c shows an example of the waveform of current (i) against time (t) of a particular column conductor in the case of a sensor element in the n+1 row which has been touched at a certain time.

The driver circuit 22 supplies to each row conductor 18 a two level signal. Such driver circuits are commonly used in diode type active matrix addressed display devices. The first level Voff holds the diode elements 16 of the sensor elements connected to a row conductor in a high impedance, off, state and the second level Von, the select level, takes them into a low impedance, on, state. The conductive stylus 50 is connected to a predetermined potential within the driver circuit 22. During the first cycle the capacitors 14 of the sensor elements are each charged to a voltage Von-$V_D$ where $V_D$ is the voltage drop across the diode element. The select level is applied at regular intervals. If during the repeat period Tr of the row conductor signal, that is the period between successive select levels, the capacitors 14 of the sensor elements of the row concerned are not discharged by touching their electrodes 44 with the stylus then the current flowing in the column conductors 20 during this period is small, simply that required to charge the capacitance of the diode elements 16 in series with the capacitors 14 to Von. The effect of this is represented by the little spikes in FIG. 5(c). If, however, an electrode 44 has been touched with the stylus (and assuming the stylus is connected to a suitable potential source) then the current flowing into the discharge capacitor 14 of the sensor element concerned via the associated column electrode will be larger. FIG. 5c illustrates the case where the sensor element in the (n+1)th row has been discharged by touching, causing a large current spike in the waveform for the column conductor concerned at the time that the sensor elements of the (n+1)th row are being addressed. The absence of such spikes is indicative that the sensor elements are in their quiescent condition.

Figure 6:
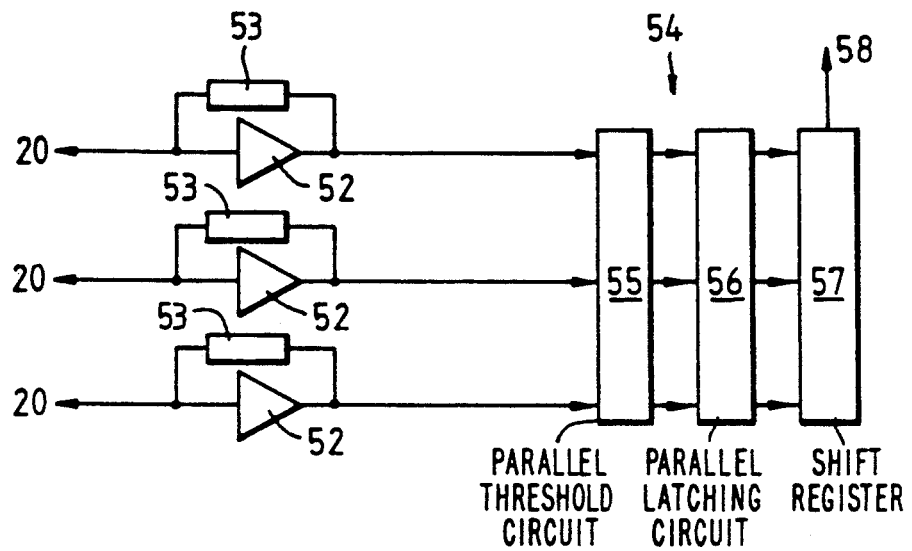
FIG. 6 illustrates part of the sensing circuit of the system.

By detecting the amplitude of the charging current with a respective sense amplifier connected to each column conductor, the system can determine which elements have been touched and their Coordinates. FIG. 6 illustrates part of a sensing and detection circuit suitable for such detection, this part comprising for simplification the circuit for just three consecutive columns of sensor elements, although it will be appreciated that other known kinds of detector circuits could be used. Each column conductor 20 of the panel 10 is connected to of an inverting amplifier 52 having a parallel feedback impedance 53. The detectors are rendered either charge or current sensitive by providing respectively a capacitive or a resistive feedback impedance 53. The outputs of the amplifiers 52 are fed to a signal processing circuit 54 comprising a parallel threshold circuit 55 responsive to the effect of large current spikes in the column conductor waveform indicative of a sensor element associated with that column having been touched to provide appropriate digital signal outputs and a parallel latching circuit 56 connected to the outputs of the threshold circuit which latches the digital signals into a series of flip flops forming a shift register 57 to give a serial output 58.

By associating the output of the processing circuit 54 with operation of the driver circuit 22 unique signals identifying the coordinates of sensor elements which have been touched can be generated in ways known per se in touch sensor systems.

In similar fashion to an active matrix addressed display device each row of sensor elements is addressed by the driver circuit 22 in turn, so that, after one complete field, an indication or picture of all sensor elements which have been touched and their position is obtained.

Addressing of the array of sensor elements in this fashion is carried out in a recurrent cycle with the condition of each sensor element being repeatedly monitored in subsequent field periods. The duration of each field period may be varied as desired taking into account the number of rows of sensor elements in the array and the duration of the select pulses applied by the drive circuit 22, which are chosen in relation to the charging characteristics of the sensor elements. By way of example each field period may be approximately 20 msec., thus giving a very rapid response to user inputs and detection of rapidly changing touch inputs.

Figure 7A:
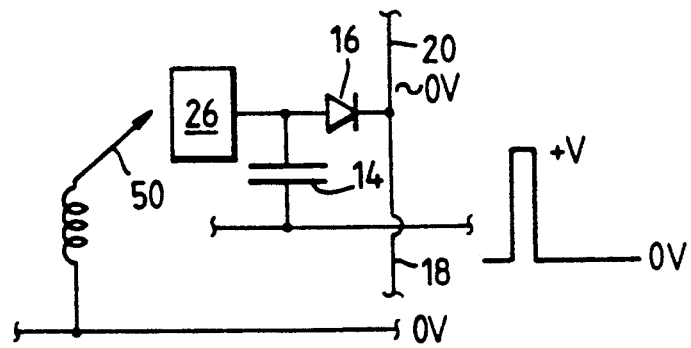
FIGS. 7a to 7d illustrate various schemes by which touch sensor array systems may be operated.

In the above described embodiment, a conducting stylus coupled to a potential source is used as a tool for entering input information. This enables small area sensor elements to be used and, in turn, allows a high resolution array to be achieved which is beneficial for use as an interface for a graphics display system for example. Other arrangements are possible, however, allowing an electrically isolated stylus or simply an operator's finger to be used for touching the sensor elements. The main requirement of the sensing process is that the capacitor of the sensor element should be discharged, at least partially, in response to touching. FIGS. 7a, b, c and d illustrate a variety of alternative schemes by which this can be achieved. In each Figure, the effective electrical circuit of a typical sensor element is shown. The sensor elements in these particular cases comprise a diode element as the active device 16 but as before other forms of unidirectional or bidirectional devices can be employed as desired.

FIG. 7a shows a grounded stylus scheme and is similar to that described with reference to FIG. 1. The conductive stylus 50 is connected to a source at 0 volts corresponding to the Voff level supplied to the row conductors 18. The column conductor is normally also at around 0 volts. Assuming the capacitor 14 is charged, then contact between the stylus 50 and the pad 26 will result in discharge of the capacitor leading to a detectable increase in current flowing through the column conductor 20 when the row conductor concerned is addressed with a select signal.

Figure 7B:
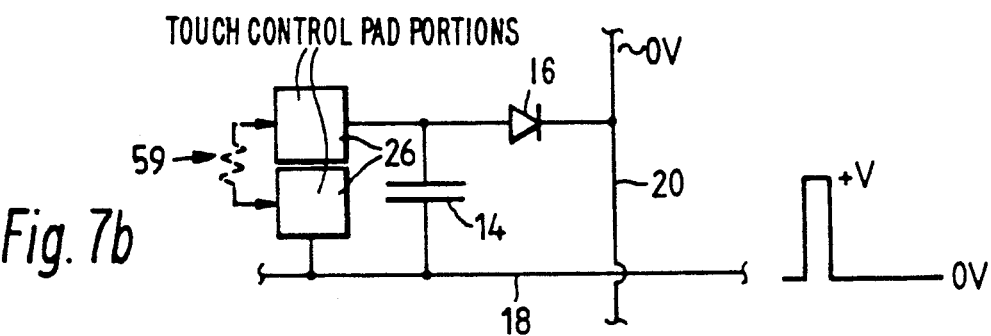

FIG. 7b shows a touch sensing scheme which enables an operator's finger or an electrically isolated stylus with a conductive tip to be used. In this scheme the touch contact pad 26 is split into two laterally-arranged portions which are electrically separated, one portion being connected to the active device 16, and possibly being constituted by one plate of the capacitor 14, and the other portion being connected directly to the row conductor 18. The two portions of the pad are of such shape and size that an operator's finger or the conductive tip of the stylus contacts and bridges both portions when touching the pad, with the effect that the capacitor 14 is discharged through the resistance of the finger or tip, as denoted by the resistance 59. This device can be of a construction similar to that shown in FIG. 3 except that an additional conductive layer is formed alongside the upper capacitor plate 44 with an interconnection to the row conductor. Similarly, the form of construction shown in FIG. 4 can be suitably modified by defining the contact pad in two parts with the one part contacting the row conductor through an appropriately positioned window provided in the insulative layer 48.

For optimum sensitivity the two portions of the pad 26 are preferably interdigitated .

The use of a stylus permits the sensor elements to be scaled down in size to provide a higher resolution capability not restricted by a finger compatible size of pad.

Figure 7C:
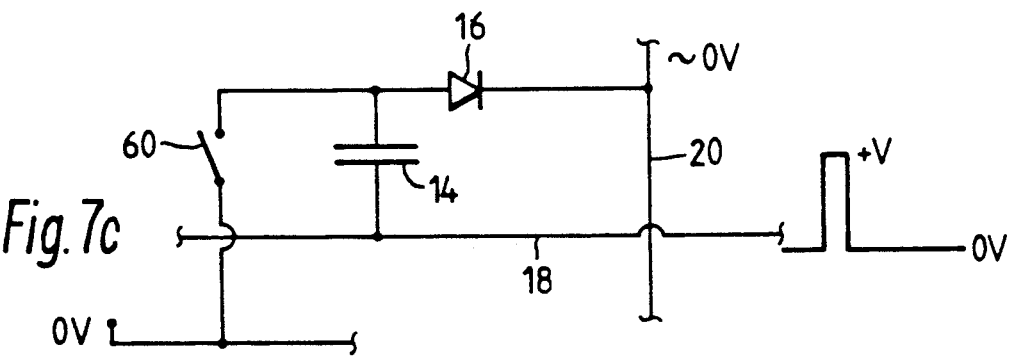
Figure 7D:
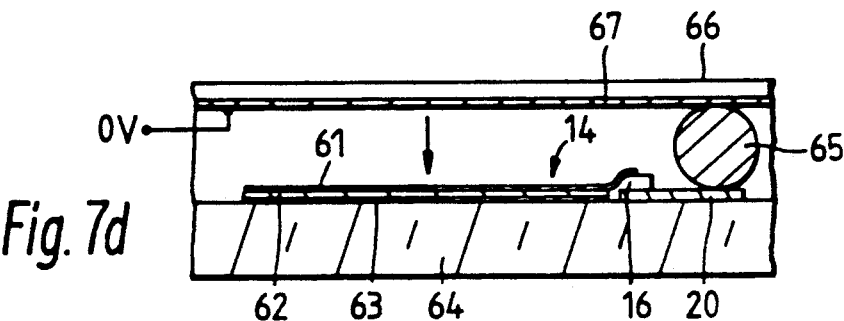

FIG. 7c shows a touch pressure sensitive scheme. In this arrangement, touching of a sensor element by a finger or insulative stylus discharges the capacitor by means of a pressure sensitive switch 60. FIG. 7d shows schematically a cross-section through a typical sensor element to illustrate one way of achieving this in practice. The capacitor 14 of the sensor element comprises a pair of superimposed conductive layers 61 and 63 separated by dielectric material 62 carried on an insulative substrate 64 and connected in series with a diode element 16 between a row conductor (not visible) and a column conductor 20. The construction of these components may be as described with reference to FIG. 3 or FIG. 4. An insulative flexible film 66 carrying a continuous, conductive layer 67 connected to ground overlies the sensor element (and all other elements in the array). The film is held taut by a support frame at the edges of the panel and is spiced from the substrate 64 by means of strategically disposed insulative spacers, one of which is shown at 65. In operation, a user touching the flexible film 66, either with a finger or a stylus, at the region overlying the capacitor 14 causes the film to deform locally inwards as indicated by the arrow thereby bringing the conductive layer 67 into contact with the upper conductive layer 61 of the capacitor 14 and hence discharging the capacitor. Other sensor elements in the array are operated in similar manner upon local deformation of the film 66.

Figure 8:
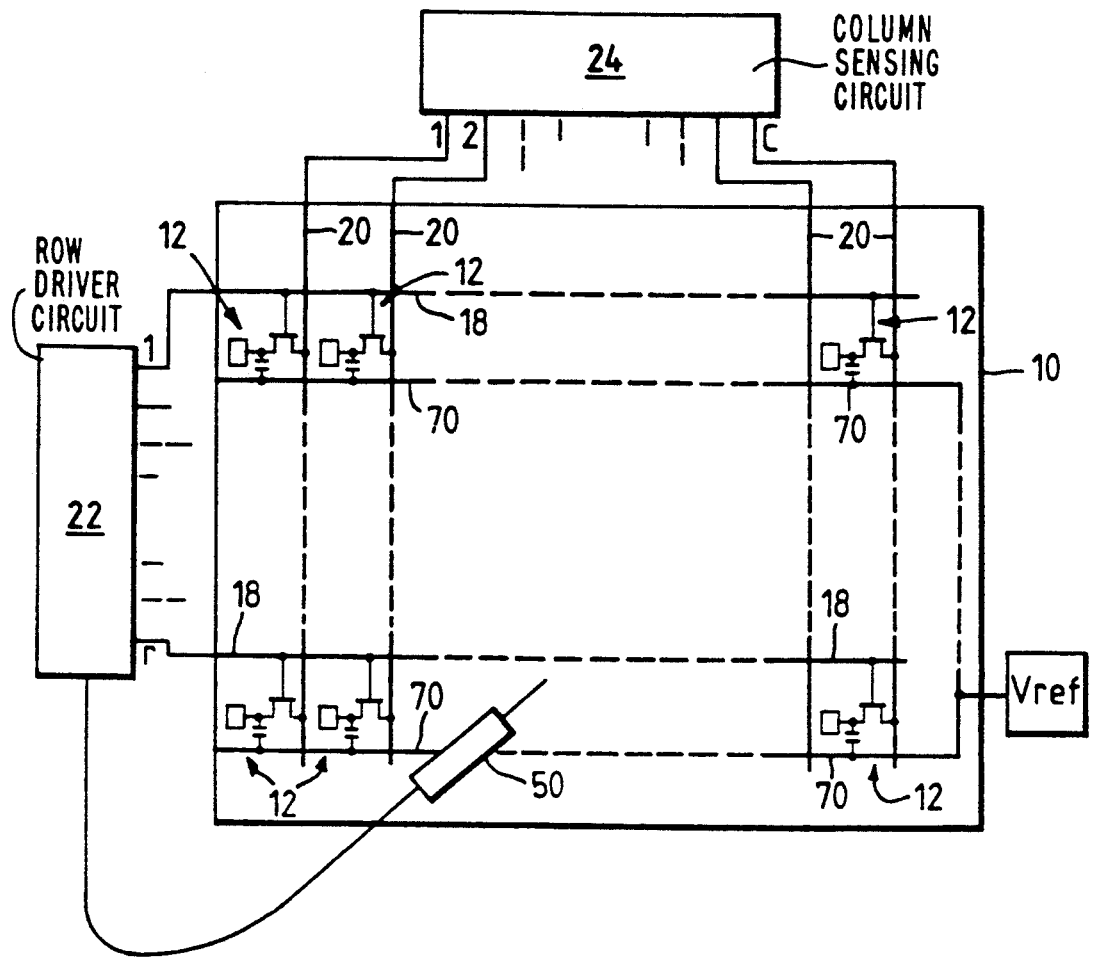
FIG. 8 is a simplified schematic block diagram of another embodiment of touch sensor array system in accordance with the invention.
Figure 9:
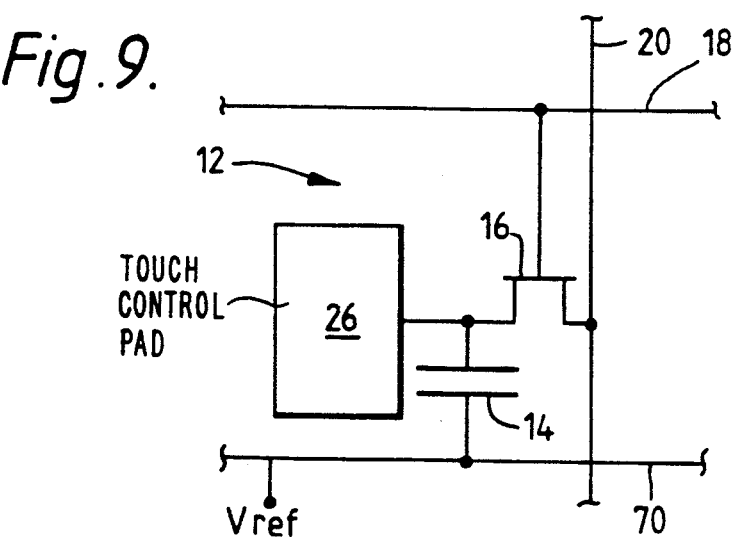
FIG. 9 shows schematically the circuit of a typical sensor element of the system of FIG. 8 comprising a three terminal switching device.

The embodiments described thus far utilise a two terminal non-linear element as the active device of each sensor element. However, three terminal active devices, in the form for example of amorphous or polysilicon TFTs, can be used. FIG. 8 is a simplified schematic block diagram, similar to that of FIG. 1, of an embodiment using TFTs as the active devices, and FIG. 9 shows the equivalent electrical circuit of a typical one of the sensor elements of this system. Components corresponding with those of the previously described embodiments are designated with the same reference numerals for simplicity. Each sensor element 12 comprises a TFT active device 16 connected in series with a capacitor 14. The gate of the TFT is connected to a respective row conductor 18 to which select signals are periodically applied by the driver circuit 22. The source and drain terminals of the TFT are connected to a column conductor 20 and one side of the capacitor 14. The other side of the capacitor 14 is connected to a one of a supplementary set of row conductors 70 extending parallel to the row conductors 18 to which a reference voltage, Vref, is supplied. A different voltage is supplied to the conductors 20. In a specific example the conductors 70 are grounded.

The applied drive waveforms in this embodiment are virtually the same as those shown in FIG. 5 with regard to two terminal active devices except that Von and Voff now refer to the gate voltages required to turn the TFT on and off respectively. The operation of the sensor element 12 is essentially the same as that previously described with the TFT being turned on by a gating pulse at Von on the row conductor 18 and charging current flowing into the capacitor via the column conductor 20, in the event of it having been discharged by touching, being detected by a detection circuit such as that described with reference to FIG. 6. As before the rows of sensor elements are addressed in turn, one at a time.

Figure 10:
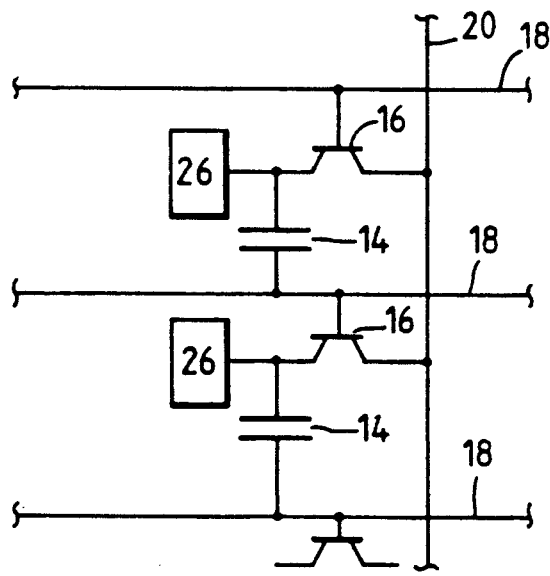
FIG. 10 shows schematically the circuit of two typical sensor elements in a modified form of the system of FIG. 8.

FIG. 10 shows a modified arrangement in which the number of conductors extending in the row direction is reduced. The circuit of two adjacent sensor elements in the same column of the array are depicted. This arrangement differs in the way in which connection is made to the side of the capacitor remote from the TFT. This side of the capacitor 14 is connected to the row conductor 18 associated with the succeeding, or preceding, row of sensor elements. This approach has the technological advantage of necessitating fewer crossovers between row and column extending conductors and less total length of bus bar, but is likely to suffer from a higher level of electrical noise on the column electrodes.

The sensor element array is similar in many respects to well known LC display devices using TFT active matrix addressing and is fabricated using conventional technology now well established in the field, with appropriate modification. The different schemes described with regard to FIG. 7 can likewise be applied to this embodiment.

The described embodiments of touch sensor array device may be used as a stand alone input interface. Alternatively they may be used as an overlay to a display device, for example a liquid crystal active matrix addressed display device. To this end, the capacitors and/or pad electrodes at least of the sensor elements should be transparent. The high resolution possible means that very precise position sensing can be achieved. When used as a display overlay, therefore, there can be a 1:1 relationship between the individual sensing elements and display pixels of the display device. For a colour display one sensor element can be provided for each triplet of display elements.

A typical liquid crystal display device comprises two spaced substrates carrying electrodes and active devices defining an array of pixels together with addressing conductors with liquid crystal material therebetween. The sensor element array is mounted over the display device with the sensor elements in registration with the display pixels.

I claim:

1. A touch sensing array system comprising a two dimensional array of sensor elements arranged in rows and columns and communicating with a grid of row conductors and column conductors in a manner that each of said sensor elements communicates with an associated different combination of a row conductor and a column conductor of said grid, each sensor element comprising an electronic switch device and a touch sensitive charge storage device having first and second alternative charge storage states said first state indicating an initial non-touched condition and said second state indicating a touched condition which is reached in response to said touch sensitive storage element being touched; and means for determining the charge storage state of each of said touch sensitive charge storage devices by sequentially selecting said sensor elements and, for each sensor element selected, completing a circuit including the electronic switch device and the charge storage device of the selected sensor element and its associated combination of a row conductor and a column conductor of said grid.

* * * * *